Nov. 3, 1953     I. L. THOMAS ET AL     2,657,471
GYROMAGNETIC COMPASS
Filed Feb. 27, 1948
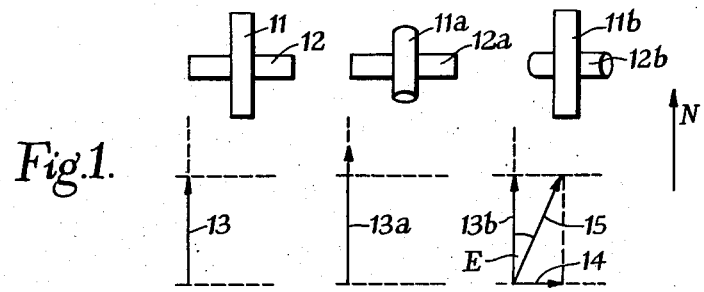
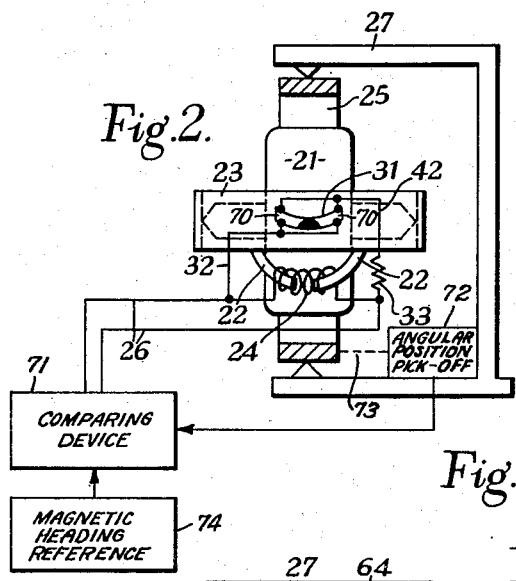
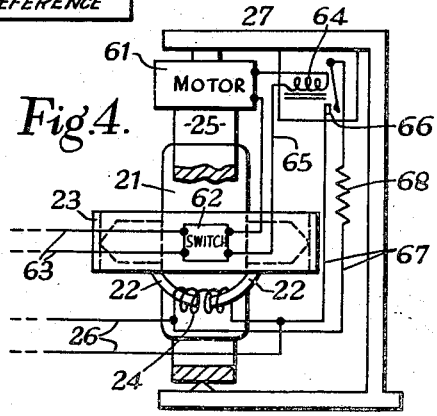
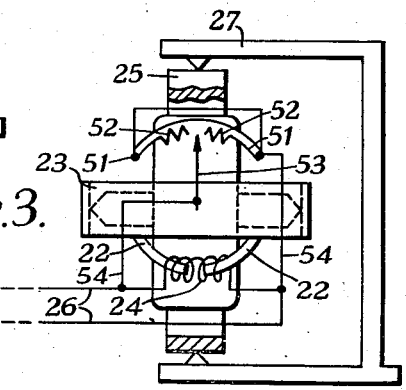
INVENTORS:
IVOR LEWIS THOMAS
GWILYM EMRYS ROBERTS
BY
Richardson, David and Nordon
ATTORNEYS.

Patented Nov. 3, 1953

2,657,471

UNITED STATES PATENT OFFICE

2,657,471

GYROMAGNETIC COMPASS

Ivor Lewis Thomas and Gwilym Emrys Roberts, South Farnborough, England, assignors, by mesne assignments, to Kelvin & Hughes Limited, Glasgow, Scotland, a company of Great Britain Application February 27, 1948, Serial No. 11,555
In Great Britain March 14, 1946

Section 1, Public Law 690, August 8, 1946
Patent expires March 14, 1966

10 Claims. (Cl. 33—222)

This invention relates to gyromagnetic compass apparatus, especially for aircraft, of the kind in which two heading references afforded by magnetic means, which are usually pendulously supported, and by an azimuth gyroscope, respectively, are compared or set one against the other to control means for adjusting the gyroscopic heading reference to correspond with the magnetic heading reference, for example as set forth in our co-pending application Serial No. 11,556, filed February 27, 1948, now Patent 2,599,124, granted June 3, 1952. It is usual in compass apparatus of this kind for the magnetic and gyroscopic heading references, to be compared by means affording an electrical output dependent upon divergence of said references and for this output to be used to control the operation of means for precessing in azimuth the gyroscope affording the gyroscopic heading reference, so that when the two references diverge said means are rendered operative in the sense appropriate to restore the gyroscopic heading reference to correspondence with the magnetic heading reference.

In view, however, of the large dip angle of the earth's magnetic field at latitudes remote from the equator, the magnetic heading reference and consequently the compass to a less extent, may be caused to be substantially in error by displacement of the magnetic means affording said reference about a horizontal axis, for example during banked turns or other manoeuvres of a craft in which the compass apparatus is installed.

It has been proposed to limit the effect of such magnetic heading reference error due to displacement of the magnetic means, by limiting the maximum rate of azimuthal precession of the gyroscope consequent upon divergence of the magnetic and gyroscopic heading references. By such limitation of said precession rate it may be ensured that the gyroscope will have been precessed only part way towards an incorrect position corresponding to a magnetic heading reference which is in error due to displacement of the magnetic means affording it, before the magnetic heading reference error disappears with the return of the pendulously mounted magnetic means to their undisplaced position or attitude.

In order further to limit the effect of the magnetic heading reference error due to displacement of the magnetic means it has been proposed to employ an additional gyroscope to actuate, when apparent gravity and/or the gyroscope frame is displaced through more than a predetermined angle, a switch or other means for preventing azimuthal precession of the gyroscopic heading reference gyroscope consequent upon divergence of the magnetic and gyroscopic heading references.

It has also been proposed to provide a magnetic gyro-compass in which a gyroscope is used for maintaining an orientation frame during short periods in a mean direction corresponding to that of the magnetic unit, characterised by the fact that the device for setting the gyroscope is arranged to have an effective action only when the angular spacing between the gyroscope and the magnetic unit is of small amplitude, while the return movement of the gyroscope towards the direction corresponding to that of the magnetic unit is very slow.

The magnetic heading reference error due to displacement of the magnetic means affording said reference will occur with displacement of said means in relation to a north-south axis, being maximum for displacement about a north-south axis and zero for displacement about an east-west axis (as explained hereinafter); and the present invention takes advantage of this "directionality" by employing the gyroscope affording the gyroscopic heading reference in compass apparatus of the kind referred to, also to actuate a switch or other means to retard and/or prevent adjustment of the gyroscopic heading reference consequent upon divergence of the magnetic and gyroscopic heading references, when conditions are such as by displacement of the magnetic means affording the magnetic heading reference to cause said magnetic heading reference to be in error.

Preferably, according to the invention an azimuth gyroscope affording the gyroscopic heading reference in compass apparatus of the kind referred to is operated so that its spin axis lies east-west when the apparatus is in use and said gyroscope has associated therewith a switch or other means actuated by displacement of the gyroscope spin axis relative to apparent gravity and/or the gyroscope frame for retarding and/or preventing adjustment of the gyroscopic heading reference consequent upon divergence of the magnetic and gyroscopic heading references.

Thus, a gyroscope affording the gyroscopic heading reference in compass apparatus of the kind referred to may have mounted on its inner gimbal a mercury switch or other gravity operated means for retarding and/or preventing the adjustment of the gyroscopic heading reference. Again, a switch or other means may have co-operating parts mounted in the inner and outer gimbals, respectively, of the gyroscope, for retarding and/or preventing said adjustment.

The anti-topple or levelling means of the gyroscope affording the gyroscopic heading reference may, however, be used to actuate a switch or other means for retarding and/or preventing the gyroscopic heading reference adjustment. For example, electric anti-topple or levelling means may include a relay whereby said adjustment is retarded and/or prevented when current flows in the anti-topple or levelling circuit.

In general, the retardation and/or prevention of gyroscopic heading reference adjustment in accordance with the invention will be effected by modification and/or interruption of the circuit of electric means for applying azimuthal precessing torque to the gyroscope, for example by shunting and/or short circuiting a precessing coil.

The invention is illustrated by the accompanying diagrammatic drawings of which:

Figure 1 shows how it is that magnetic heading reference error due to displacement of the means affording said reference is maximum for such displacement about a north-south axis and zero for such displacement about an east-west axis;

Figures 2, 3 and 4 show arrangements according to three forms of the invention for preventing and/or retarding gyroscopic heading reference adjustment consequent upon divergence of the gyroscopic and magnetic heading references when conditions are such as by displacement of the magnetic means affording the magnetic heading reference to cause said magnetic heading reference to be in error, the arrangement of Figure 2 being responsive to displacement of apparent gravity, that of Figure 3 to displacement of the gyroscope spin axis relatively to the gyroscope frame and the arrangement of Figure 4 utilising electric anti-topple or levelling means of the gyroscope; and Figure 5 is a fragmentary view illustrating a modified arrangement responsive to displacement of apparent gravity.

In Figure 1 the direction of the horizontal component of the earth's magnetic field is indicated by an arrow N, and at 11 and 12 are indicated two electro-magnetic detector elements disposed with their axes north-south and east-west respectively. The outputs obtained from these detector elements 11 and 12, being proportional to the components of the earth's field along their axes, may be represented by the north-south vector 13 in the case of the north-south element 11 and will be zero in the case of the east-west element 12. Suppose now the detector elements are tilted about an east-west axis to the positions indicated at 11a and 12a, the output from the element 11 will be increased as indicated by vector 13a because its axis now lies more nearly or exactly in the direction of the earth's field (according to the dip angle) but the output from the element 12 will remain zero, so that no error will be introduced into a magnetic heading reference defined by the outputs from the elements 11 and 12. In the case, however, where said elements 11 and 12 are tilted about a north-south axis as indicated at 11b and 12b the output from the north-south element 11 will remain unchanged the same as 13, as indicated at 13b, but owing to the dip angle of the earth's field there will be an output from the east-west element 12 corresponding to the component along its axis of the vertical component of the earth's field and which may be represented by the vector 14 east-west, so that the resultant output from the two elements 11 and 12 may in this case be represented by the vector 15, the angle E between which and the north-south vector 13b is a measure of the error introduced into the magnetic heading reference by the tilting of the elements to positions 11b and 12b.

It will be seen that no matter what is the orientation of the detector elements 11 and 12 about a vertical axis the magnetic heading error introduced by tilting them will be maximum for tilting about a north-south axis and zero for tilting about an east-west axis. It will be apparent also that where a swinging magnet is employed its indications or a heading reference afforded thereby will be similarly in error.

Therefore, the gyroscope affording the gyroscopic heading reference, in compass apparatus of the kind referred to, may be made sensitive to all conditions giving rise to error in the magnetic heading reference due to displacement of the magnetic means affording it, by operating said gyroscope with its spin axis east-west.

In the arrangements shown in Figures 2 to 5, of the drawings adjustment of the gyroscopic heading reference consequent upon divergence of the magnetic and gyroscopic heading references in a compass of the kind referred to is effected by precessing in azimuth a gyroscope 21 of which the spin axis is disposed east-west, means for applying the precessing torque being indicated as a pair of arcuate permanent magnets 22—22 extending with like poles adjacent from the inner gimbal, indicated at 23, to co-operate with a coil, indicated at 24 which is mounted (by means not shown) on the outer gimbal, indicated at 25, and which is connected by leads, indicated at 26, with known or convenient means (not shown) for energising it in the appropriate sense when the magetic and gyroscopic heading references diverge. The gyroscope frame is indicated at 27.

Referring to Figure 2, there is shown an embodiment of the invention in which an upwardly curved arcuate mercury switch 31 is shown provided with a pair of contacts 70 at each end, each pair of contacts 70 being arranged to be bridged when the mercury within the switch moves to either end in response to angular displacement of the mercury switch 31 in either direction from the horizontal position in which it is illustrated in Figure 2. The mercury switch 31 is mounted on the inner gimbal 23 and its contacts 70 are connected through the conductors 32 and 42 across the precession coil 24, a series resistor 33 being included in the connection through conductor 42. Thus, whenever contacts 70 are closed, the resistor 33 is shunted across the precession coil 24. The contacts 70 are arranged to close whenever the apparent direction of gravity varies in an easterly or westerly direction by an amount greater than a small predetermined angle, such as three degrees, for example. The precessing effect applied by the precession coil 24 is reduced by the shunting action of resistor 33 during closure of the contacts 70 of mercury switch 31. By the omission of the resistor 33 and the use of a direct connection to the precession coil 24 through conductor 42, a short circuit may be applied to the precession coil 24 during closure of mercury switch contacts 70 which will completely suppress all precessing action.

The input to the precession coil 24 is derived from a comparing device 71 and applied to precession coil 24 via a pair of conductors 26. This input takes the form of a unidirectional control potential.

The comparing device 71 receives a first input signal from an angular position pickoff 72 which is responsive to the angular position of the outer gimbal 25 with respect to the gyroscope frame 27. The connection, either physical, electrical, or inductive between the outer gimbal 25 and the angular position takeoff 72 is indicated diagrammatically by the broken line 73. Angular position pickoff devices of this type are known in the art and any desired form may be used.

The comparing device 71 receives a second input from a magnetic heading reference device 74 which includes the magnetic detector elements 11 and 12 shown in Figure 1.

These two inputs are compared by the comparing device 71 in known manner, to produce a unidirectional control potential whose direction and magnitude are determined by the direction and magnitude of any deviation of the gyroscopic heading from the magnetic heading, the gyroscopic heading being derived, as noted above, from the angular position pickoff 72 and the magnetic heading being derived from the magnetic heading reference device 74. Comparing devices of this character are known in the art and any convenient type may be used.

In the modification shown in Figure 5, the inner gimbal 23 carries a resistance element indicated at 41 which is interrupted midway of its length and has its ends connected together and by a lead 32 with one end of the precsssion coil 24, as in Figure 2, whilst a moving contact arm 43 co-operating with said interrupted resistance element 41 and connected by a lead 42 with the other end of the coil 24 is adjusted about the pivot axis, indicated at 45, of the inner gimbal 23 in accordance with displacement of apparent gravity east-west by means of a pendulum 46 secured to said contact arm 43. It will be seen that by these means the precession of the gyroscope 21 may first be retarded progressively and then, as apparent gravity is increasingly displaced east or west in excess of a predetermined angle, prevented altogether by the short circuiting of the precession coil 24 when the contact 43 reaches either end of the resistance 41. Said resistance 41 may terminate at each end in a conductive segment, not shown.

In the arrangement shown in Figure 3, a pair of spaced segments 51 mounted (by means not shown) on the outer gimbal 25 and which, as indicated at 52, may be constituted in part by resistances 52, have co-operating therewith a moving contact arm 53 mounted on the inner gimbal 23. The segments 51 are connected together and with one end of the precession coil 24 and the contact arm 53 is connected with the other end of the coil 24, by leads 54. Thus, movement of the inner gimbal 23 in relation to the outer gimbal 25 will either short circuit, or first shunt with a resistance 52 and then short circuit, the precession coil 24 and so retard and/or prevent precession thereby of the gyroscope 21 to adjust the gyroscopic heading reference. If desired, where there are no resistances 52 a resistance (not shown) may be included in one of the leads 54, in the same manner as the resistance 33 is included in the lead 42 in Fig. 2, so that precession of the gyroscope by the coil 24 will be retarded and never actually prevented when the gyroscope spin axis tilts relatively to the frame 27.

In the case of Figure 4 of the drawings, electric anti-topple or levelling means of the gyroscope 21 shown as comprising a torque motor, indicated at 61, for applying azimuthal torque to the gyroscope 21 and a switch indicated at 62, mounted on the inner gimbal 23 for controlling the connection of supply leads 63 to said motor 61, are employed to prevent precession of the gyroscope 21 by the coil 24. For this purpose the winding, indicated at 64, of a relay mounted on the frame 27 is included in one lead 65 between the motor 61 and switch 62, and the normally open contacts 66 of the relay are connected with the ends of the coil 24 by leads 67, one of which contains a resistor 68 so that said coil 24 will be shunted by this resistor whenever said contacts 66 of the relay are closed by the flow of current in the anti-topple or levelling circuit through the relay winding 64. In this case also the resistor 68 may be omitted, whereby said coil 24 will be short circuited, and the azimuthal precession of the gyroscope by coil 24 prevented instead of merely retarded when the contacts 66 are closed.

Arrangement such as that of Figure 4 employing the anti-topple or levelling means of the gyroscope do not involve additional connections to the inner gimbal and, especially where the anti-topple or levelling means are gravity operated, are to be preferred to arrangements like that of Figure 2 where additional complication at the inner gimbal is involved.

Although in general gravity responsive arrangements are preferable in use, arrangements responsive to tilt of the gyroscope spin axis relative to the gyroscope frame will give satisfactory results, the fact that they will function to prevent and/or retard adjustment of the gyroscopic heading reference consequent upon divergence of the magnetic and gyroscopic heading references when conditions are not such as to cause the magnetic heading reference to be in error (e. g. when there is a lateral list on a north-south course or a fore and aft or pitch displacement on an east-west course), being of little consequence.

It will be apparent that the switch or other means actuated by the gyroscope may in some cases be employed to break, or to introduce impedance into, a circuit to prevent adjustment of the heading reference afforded by the gyroscope, irrespective of whether such adjustment is effected by a precession coil and magnets, such as 24 and 22, or otherwise.

Also, it will be understood that the invention is applicable to gyromagnetic compass apparatus of the kind referred to irrespective of whether the magnetic heading reference is derived from magnetic means of pivoted permanent magnet type or is derived from means of electro-magnetic detector elements of flux gate or earth inductor type.

We claim:

1. Gyromagnetic compass apparatus comprising a base, magnetic means mounted upon said base to afford a magnetic heading reference, an azimuth gyroscope mounted upon said base to afford a gyroscopic heading reference, said gyroscope having an inner gimbal in which the gyroscope rotor is rotatably mounted adjusting means responsive to differences between said heading references for adjusting said gyroscopic heading reference to substantial correspondence with said magnetic heading reference and to a position in which the rotor axis of the gyroscope lies in a substantially vertical east-west plane, and switch means mounted at least partly upon said inner gimbal and responsive to movement of said inner gimbal about a north-south axis to reduce the response of said adjusting means.

2. Apparatus according to claim 1, wherein said switch means is a gravity-operated switch.

3. Apparatus according to claim 2, wherein said switch means is a mercury switch.

4. Apparatus according to claim 1, wherein said switch means comprises two variable resistance elements with free ends and having the opposite ends of the two elements connected together, and contact means selectively movable over said resistance elements, commencing at the free end of each element, said contact means having a normal position in which no contact is established with either resistance element, said response reduction being effected by a circuit including said interconnected ends of said resistance elements and said movable contact means.

5. Apparatus according to claim 4, wherein said azimuth gyroscope further comprises an outer gimbal ring, a portion of said switch means being mounted on said outer gimbal ring the movement of said contact means relative to said resistance elements being determined by the position of said inner gimbal ring relative to said outer gimbal ring.

6. Apparatus according to claim 4, further comprising a gravity actuated member movably supported by said inner gimbal ring, a portion of said switch means being supported by said gravity actuated member, the movement of said contact means relative to said resistance elements being determined by the relative positions of said gimbal ring and said gravity actuated member.

7. Gyromagnetic compass apparatus comprising magnetic means to afford a magnetic heading reference, an azimuth gyroscope to afford a gyroscopic heading reference, adjusting means responsive to differences between said heading references for adjusting said gyroscopic heading reference to substantial correspondence with said magnetic heading reference, an anti-topple device for applying, when actuated, azimuthal torque to said gyroscope and control means operating in response to actuation of said anti-topple device to reduce the response of said adjusting means.

8. Gyromagnetic compass apparatus comprising magnetic means to afford a magnetic heading reference, an azimuth gyroscope to afford a gyroscopic heading reference, adjusting means responsive to differences between said heading references for adjusting said gyroscopic heading reference to substantial correspondence with said magnetic heading reference, and electric anti-topple device for applying azimuthal torque to said gyroscope, a switch device for making and breaking the circuit of said anti-topple device, and control means operating in response to current in said circuit to reduce the response of said adjusting means.

9. Apparatus according to claim 8, wherein said adjusting means comprise an electromagnetic device having an operating winding and wherein said current is applied to reduce current in said winding.

10. Apparatus according to claim 8, wherein said adjusting means comprise an electromagnetic device having an operating winding and wherein said apparatus includes a relay actuated by said current to reduce current in said windings.

IVOR LEWIS THOMAS.
GWILYM EMRYS ROBERTS.

References Cited in the file of this patent
UNITED STATES PATENTS

| Number | Name | Date |
|---|---|---|
| 2,126,935 | Von Manteuffel | Aug. 16, 1938 |
| 2,199,850 | Carter | May 7, 1940 |
| 2,222,458 | Wunsch | Nov. 19, 1940 |
| 2,357,319 | Esval et al. | Sept. 5, 1944 |

FOREIGN PATENTS

| Number | Country | Date |
|---|---|---|
| 586,507 | Great Britain | Mar. 20, 1947 |
| 818,850 | France | June 28, 1937 |